United States Patent
Young

[15] 3,670,259
[45] June 13, 1972

[54] DOUBLE Q-SWITCH LASER
[72] Inventor: Charles Gilbert Young, Storrs, Conn.
[73] Assignee: American Optical Corporation, Southbridge, Mass.
[22] Filed: April 13, 1970
[21] Appl. No.: 27,529

Related U.S. Application Data
[63] Continuation-in-part of Ser. No. 831,558, June 9, 1969, abandoned.

[52] U.S. Cl. ................................................. 331/94.5
[51] Int. Cl. .................................................. H01s 3/11
[58] Field of Search ................................... 331/94.5

[56] References Cited
UNITED STATES PATENTS
3,398,379   8/1968   Sims et al.............................331/94.5

Primary Examiner—Ronald L. Wibert
Assistant Examiner—T. Major
Attorney—William C. Nealon, Noble S. Williams, Bernard L. Sweeney and Robert J. Bird

[57] ABSTRACT

In a laser apparatus, both ends of the laser rod are simultaneously Q-switched effectively. A rotating mirror is provided, in a particular arrangement with fixed mirrors, to provide effectively two counter-rotating mirrors for Q-switching of both ends of the laser rod.

9 Claims, 5 Drawing Figures

INVENTOR
CHARLES GILBERT YOUNG

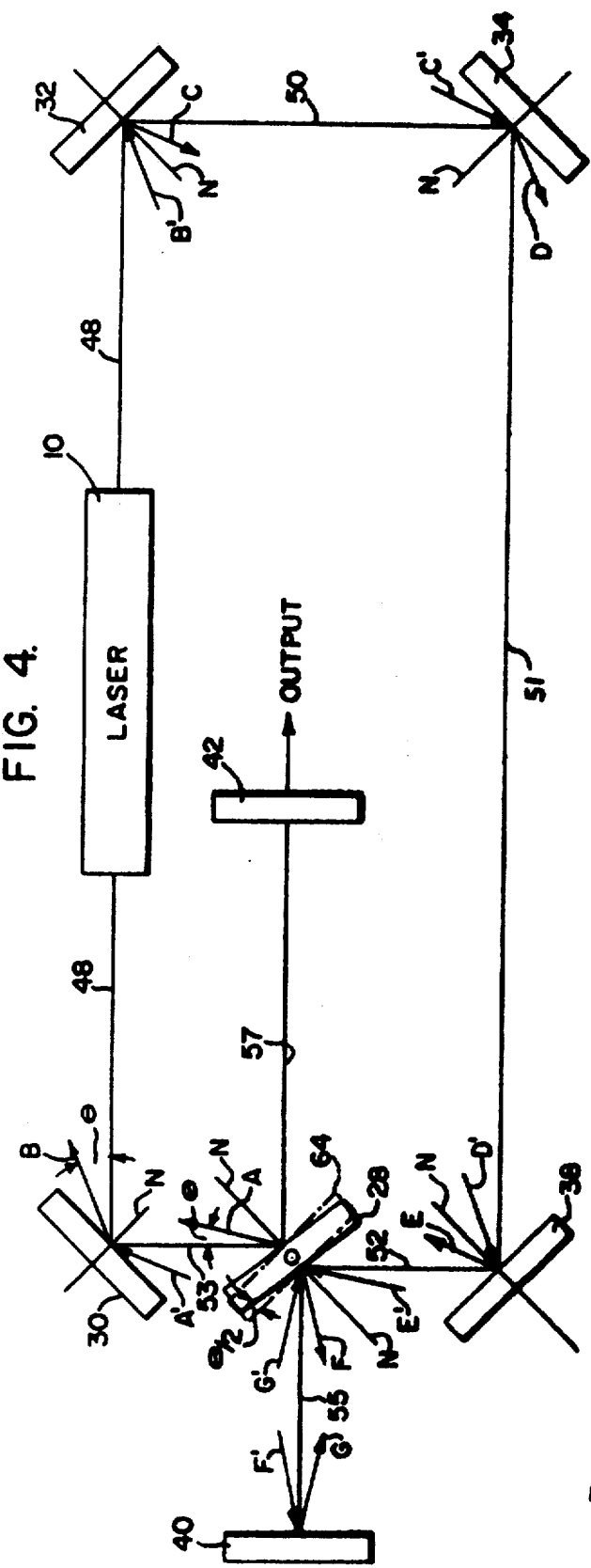
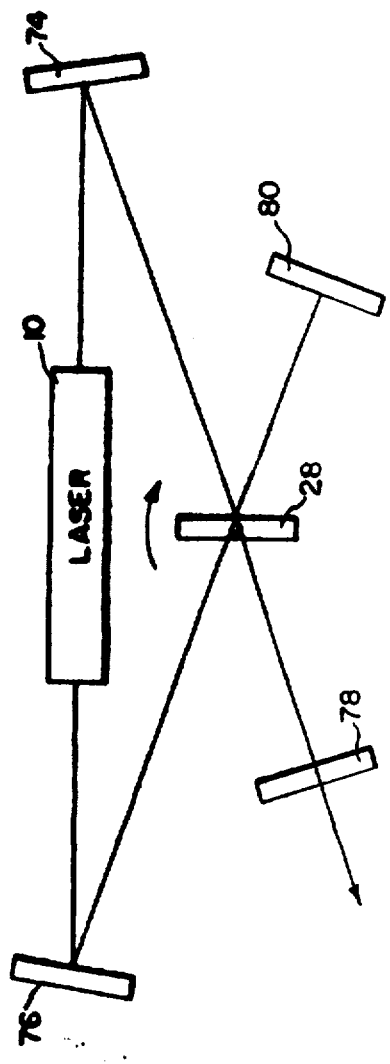
INVENTOR
CHARLES GILBERT YOUNG
AGENT

DOUBLE Q-SWITCH LASER

CROSS-REFERENCES TO RELATED APPLICATIONS

This application is a continuation-in-part of my copending application, Ser. No. 831,558, filed June 9, 1969 now abandoned.

BACKGROUND OF THE INVENTION

This invention relates primarily to lasers and, more particularly, to Q-switched lasers.

The laser is a device for generating highly intense coherent light by use of an apparatus such as that described by Townes and Schawlow in "Physical Review," volume 112, page 1,940 (1958). The structure basically comprises a rod of a suitable laser material (which may be a gas, crystal, glass, etc.) disposed in a high-Q resonant cavity of the Fabry-Perot interferometer type with a reflector at one end and a partially transmissive reflector (about 1 to 96 percent transmissive) at the other end. When the laser material is illuminated by a flash tube or the like, if an excess of the atoms or molecules are excited into a higher metastable energy level of the laser material, a condition commonly called a negative temperature condition is produced. This process of optical pumping with the flash tube is triggered by suitable pump source electronics. The atoms or molecules in the upper metastable energy level begin almost immediately to fall spontaneously back to the lower energy levels in a process usually referred to as fluorescence because the process involves the release of light energy. During propagation back and forth in the resonant cavity, the light wave which was emitted stimulates additional upper to lower energy level transitions and is usually referred to as the induced emission or laser output. Superposition of the induced emission on the spontaneous emission takes place and the laser output in the form of highly coherent, intense light is emitted through the partially transmissive reflector.

The most desirable configuration for obtaining higher gain in a laser rod is that of a long, thin rod (about a 40 to 1 aspect ratio). In such configurations, the mirror loss in the cavity becomes far less significant than with shorter rods. However, long rods sometimes present a difficulty in that the upper energy level may become prematurely depleted by the spontaneously emitted light propagating through the rod and stimulating additional transitions. A few years ago, it was suggested that this difficulty could be overcome by Q-modulation of the laser rods in order to instantaneously release the entire laser output. In this way, by continuing to pump the laser rod, a greater negative temperature condition (more atoms or molecules above threshold) is allowed to occur before oscillation is permitted and the output pulse is taken at the point of greatest inversion. In general, such Q-switching or modulation is done with a rotating element, such as a rotating mirror or prism at one end of the laser rod. When the Q-switching element is out of optical alignment with the reflector at the other end of the resonant laser cavity, an output pulse is not obtained. However, further problems are caused in that the spontaneous emission (noise) depletes the population inversion. In the usual Q-switching arrangement, the spontaneous emissions which arise at the switching end of the laser rod make a double pass to the fixed mirror and back, thereby unduly depleting the inversion before the Q-switch opens. Also, in lasers where both ends of the rod are immersed in a fluid coolant, there may be sufficient incidental reflection due to index of refraction discontinuities or scattering at the switched end of the rod to allow oscillation before switching. Antireflective coating of the surfaces involved may represent an incomplete solution due to the laser power density limitations of these coatings in some otherwise desirable fluid environments.

SUMMARY OF THE INVENTION

Accordingly, a primary object of the present invention is to provide means by which long laser rods may be made to be efficiently usable in a laser system.

A further object is to provide means by which a Q-switched configuration of a laser system is usable to substantially prevent premature laser oscillation and output.

These and other objects are accomplished in a preferred embodiment of the present invention wherein, simultaneously, both ends of the laser rod are effectively Q-switched. In effect, two counter-rotating mirrors are provided, one at either end of the resonant cavity for the laser rod, by disposing a single rotating mirror in an arrangement with a plurality of fixed mirrors to provide simultaneous switching, i.e., double Q-switching, of both ends of the laser rod. By the use of only a single rotating mirror, the switching speed of the Q-switch is increased so as to provide an instantaneous discharge of the laser output at the time when the population inversion in the laser rod is the greatest. With the double Q-switch effectively counter-rotating, there is only one instant per cycle when both ends of the resonant cavity are optically aligned to enable oscillation to occur. The prevention of the deterioration of the mirror by the highly intense Q-switched output is provided by having the laser beam at approximately a 45° angle of incidence to the mirror during Q-switching. Premature Q-switching is prevented by a slight tilting of the axis of rotation of the single rotating mirror in order to avoid normal incidence of the laser light on the reflecting surfaces.

Other objects and advantages of the invention will become apparent by reference to a detailed description of a preferred embodiment and its construction.

BRIEF DESCRIPTION OF THE DRAWING

In the drawing:

FIG. 4 is a schematic representation of the laser and mirror assembly for the embodiment of FIG. 2, showing the direction of light rays propagating therethrough; and FIG. 5 is a schematic representation of an alternative mirror arrangement to that shown in FIGS. 2 and 4.

DETAILED DESCRIPTION OF THE PREFERRED EMBODIMENTS

Figure 1:
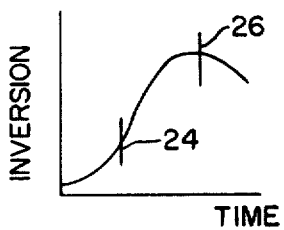
FIG. 1 is a plot of the population inversion in a laser rod versus time.

A laser system according to the present invention is provided with effective counter-rotation of the resonant cavity end mirrors to insure that there will be but a single instant in each cycle of the laser when the mirrors are optically aligned to enable laser oscillation to begin. This single instant 26 is clearly shown in FIG. 1 where a characteristic population inversion versus time plot is shown. Depletion of the population inversion at a point 24 might, for instance, be below the threshold necessary for the laser oscillations to occur. Even if the point 24 is above the threshold, a greater output is obtainable by "dumping" the output instantaneously at the point 26.

Figure 3:
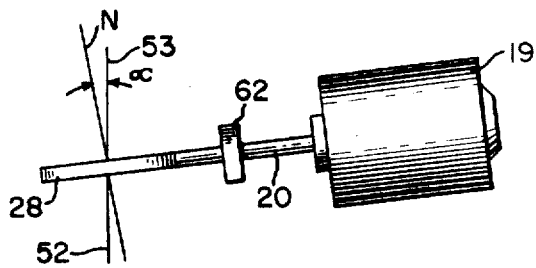
FIG. 3 is a schematic representation of a motor and shaft for rotating the switching mirror.
Figure 2:
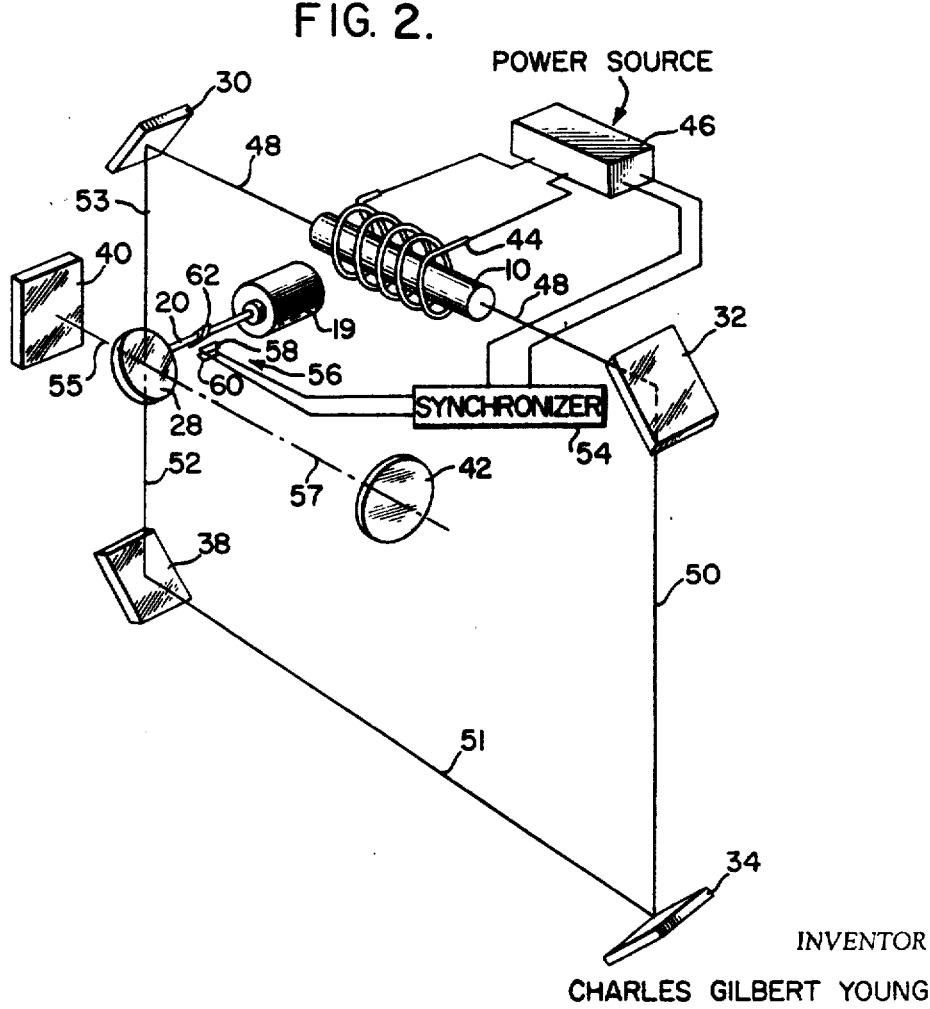
FIG. 2 is a schematic representation of a preferred arrangement of the invention including a single rotating mirror and an associated plurality of fixed mirrors.

The apparatus shown in FIGS. 2, 3, and 4 is intended to overcome these problems by providing a laser system wherein a single rotating mirror 28 is placed in an arrangement with a plurality of fixed mirrors 30, 32, 34, 38, and 40 and a partially transmissive fixed reflector 42. The system includes a flash tube 44 and its associated pumped electronics 46 for the purpose of attaining the necessary negative temperature condition. The flash tube 44 is circumferentially disposed about a laser rod 10. A reflector, not shown, generally surrounds the rod and associated flash tube to focus a maximum of the pumping light generated by the flash tube 44 upon the rod 10. After attainment of the required population inversion, a laser output may be caused to occur along an optical axis 48 which is generally coincident with the axis of the rod 10.

The output from the laser rod 10 is incident on a pair of fixed reflectors 30 and 32 which are disposed on the optical axis 48 at opposite ends of the laser rod 10. The mirror 32 reflects the incident laser output along a transverse optical axis 50 to another fixed mirror 34. It is then reflected to another fixed mirror 38 along an optical axis 51, from which the output travels along an optical axis 52 to a rotating mirror 28 having two reflecting surfaces. From there the rays propagate along an optical axis 55 to a fixed mirror 40 which is normal to the optical axis 55, and then back to the rotating mirror 28 for return to the laser rod via the fixed mirrors 38, 34, and 32.

From the other end of the laser rod, the laser output is reflected from the mixed mirror 30 to the other surface of the rotating mirror 28 and then to a partially transmissive output mirror 42 along an optical axis 57. At the mirror 42 some of the output energy is emitted from the system and the balance is reflected to the rotating mirror 28 and back to the fixed mirror 30.

It should be noted at this time that the above description is pertinent only for those instants when the rotating mirror 28 causes optical alignment to occur between the stationary reflectors 40 and 42 which form the ends of the resonant cavity.

In addition, although this description is set forth with a glass laser rod and a flash tube, it is intended that the term laser rod encompasses all types of active laser material configurations, gas, crystal, etc. And the flash tube generally refers to the preferred means for pumping the particular laser material.

There are numerous ways of operating a system of this type. One way is to pump the laser rod 10 continually and to rotate the mirror 28 at a predetermined rate which will allow the population inversion to reach the desired levels before the alignment of the end mirrors occurs. A second mass is shown in FIGS. 2 and 3. A motor 19 has a cam 62 mounted on its shaft 20. As the motor 19 turns, the cam 62 causes the contacts 58 and 60 of a switch 56 to alternately open and close. The action of the switch 56 activates a synchronizer means 54 to coordinate the operation of pump electronics 46 with the position of the rotating mirror 28. In this way, any convenient type of motor may be used, but preferably one which is variable in speed of rotation in response to a control signal.

As was stated previously, the single rotating mirror 28, in the scheme described herein, provides effectively and optically the same Q-switching performance as two highly synchronized counter-rotating mirrors. This phenomenon is best illustrated by reference to FIG. 4. In this figure, typical off-axis rays are depicted as propagating through the system for illustrative purposes; however, as will be apparent from the description, these rays are actually dispelled before oscillation can commence.

The normal to each of the mirrors 28, 30, 32, 34, and 38 is designated N. It will be remembered that the angle between a ray incident on a mirror and the normal to the mirror at that point is equal to the angle between the normal and the exiting ray. Choosing mirror 28 as a starting point, a ray reflected by the partially transmissive mirror 42 to the rotating mirror 28 will be directed in a direction represented by arrow A at an angle $\theta$ to the optical axis 53, presuming that the mirror 28 has been rotated to its position in FIG. 4 from a previous position designated 64 which is at an angle $\theta/2$ to the dark-line position. The ray A will be incident on mirror 30 (as shown by arrow A') also at an angle $\theta$ to the optical axis 53. Reflection from the mirror 30 will produce ray B to propagate through the laser rod 10 along the optical axis 48 to the fixed mirror 32. At the point of incidence on the mirror 32, the ray B is depicted as B' and will reflect as ray C, also at an angle $\theta$ to the optical axis 50. The process of reflection and rotation of the rays continues through the system as shown by rays, C', D, D', E, E', and F. It may be seen that the angle $\theta$ which the ray F makes with the optical axis 55 is the same as the beginning angle for the ray A. However, in the case of the ray F, the angle is as if the rotation of the mirror 28 were in the opposite direction, thus simulating two counter-rotating mirrors.

To be effectively counter-rotating, the number of additional fixed mirrors disposed in the resonant cavity must be even. If the number were odd, the two end mirrors would be rotating effectively in the same direction. If the mirrors rotate in the same direction, there is a relatively long time when alignment of the mirrors is close enough to stimulate emissions. This would defeat the Q-switching function of the laser system. Therefore, the mirrors should be counter-rotating.

The ray F, when incident upon the end mirror 40 as F', is reflected back to the rotating mirror 28 as ray G — G'. The ray G' is incident on the mirror 28 at a greater angle than was the ray F. Hence, any off-axis rays, whether caused by off-axis modes of the laser or by the orientation of the Q-switching mirror, are not propagated along the optical axes, but are dispelled from the system. Therefore, it is seen that only those rays which are parallel to the optical axis when the rotating mirror brings the end reflectors into optical alignment are reflected back through the laser rod to stimulate emissions.

One further problem does occur in the arrangement shown in FIG. 4. When the rotating mirror is normal to the optical axes 52 and 53, the surfaces of the mirror 28 could act as the end reflectors and cause oscillation to occur. To avoid the premature depletion of the metastable energy state or the possible damage to the mirror if a highly intense beam were directly incident on it, the arrangement shown in FIG. 3 was devised. The motor 19, the shaft 20, and the mirror 28 are positioned such that the normal N of the mirror 28 forms a minimum angle $\alpha$ with the optical axes 52 and 53. Therefore, no rays are directly reflected immediately back into the laser rod.

A less complex arrangement is shown in FIG. 5 wherein a laser rod 10 is arranged with fixed mirrors 74, 76, 78, and 80, and a rotating mirror 28. The output is taken from the partially transmissive fixed mirror 78. The operation of such a system is similar to that described with reference to FIG. 4. However, as can be seen, the rays strike the mirrors at much smaller angles of incidence than those of the apparatus shown in FIG. 4. These smaller angles of incidence require lower power densities in the laser beam to avoid damage to the mirror surfaces.

At this point it might be helpful, with reference to FIGS. 4 and 5, to describe the nomenclature being used. It is presumed that the mirrors (for instance mirror 28) extend sufficiently to receive a reflection from an adjacent mirror designated by an unprimed letter. Thus, the primed letters are shown as parallel to the corresponding unprimed letters, but actually both the primed and unprimed letters are the same ray. Except that at each successive reflection the propagating ray strikes farther from the respective optical axis-mirror intersection, thus aiding in the expulsion of off-axis rays from the system.

For low power systems, the rotating mirrors may be adjusted to near normal incidence to reduce windage, flexture, and motor power requirements. When the system is capable of attaining extremely high laser power, the incidence angles for the mirrors should be sufficiently greater than normal incidence to maintain the mirror surface for a longer lifetime. Also, in the interest of economy, the same mirror surface can be used for both reflections (see mirror 28 in FIG. 5).

Further alternative embodiments are contemplated wherein physically rotating mirrors are replaced by electro-optic devices such as Faraday rotation devices, Kerr cells, or Pockel cells; or polarization techniques, wherein the polarizer and analyzer are 90° apart to prevent output until one or the other has its polarization changed by an applied voltage.

While there have been shown and described what are considered to be preferred embodiments of the present invention, it will be obvious to those skilled in the art that various changes and modifications may be made therein without departing from the present invention.

I claim:
1. A double Q-switched laser comprising
   a laser rod,
   means for optically pumping the active ions in the laser rod,
   a resonant cavity which is defined by a fixed, partially transmissive mirror which is optically positioned at one end of the laser rod, and a fixed, totally reflective mirror which is optically positioned at the opposite end of the laser rod for reflecting emitted light back through the laser rod to stimulate further emissions, and a rotating mirror located in the optical path between the fixed, partially transmissive mirror and the laser rod, and located in the optical path between the fixed, totally reflective mirror and the laser rod whereby the rotating mirror at a rotational position causes simultaneous alignment of the laser rod with both of the fixed mirrors defining the optical cavity whereas, at other rotational positions, the rotating mirror precludes alignment of the laser rod with either of the fixed mirrors defining the optical cavity.

2. A double Q-switched laser system according to claim 1, which further comprises an even number of additional fixed mirrors being disposed in the optical paths.

3. A double Q-switched laser system according to claim 2, in which four additional fixed mirrors are disposed in the system so as to form the optical path into a quadrilateral shape.

4. A double Q-switched laser system according to claim 3, in which three of the additional mirrors are disposed between one end of the laser rod and the rotating mirror.

5. A double Q-switched laser system according to claim 2, in which two additional fixed mirrors are disposed in the system so as to form the optical path into a triangular shape together with the rotating mirror.

6. A double Q-switched laser system according to claim 5, in which the rotating mirror is optically positioned between the two additional mirrors.

7. A double Q-switched laser system according to claim 1, wherein a motor is provided for rotating the rotating mirror, the motor having its axis disposed at such an angle as to cause the rotating mirror to be at an angle other than normal to the optical path.

8. A double Q-switched laser system according to claim 1, wherein means are provided for synchronizing the rotation of the rotating mirror and the operation of the means for optically pumping.

9. A double Q-switched laser system according to claim 1, wherein mirror means are provided at angles to the optical path so as to cause an output pulse from the system at a time of maximum population inversion in the laser rod.

* * * * *